US009122554B2

(12) United States Patent
Callaghan et al.

(10) Patent No.: US 9,122,554 B2
(45) Date of Patent: Sep. 1, 2015

(54) PERVASIVE SERVICE PROVIDING DEVICE-SPECIFIC UPDATES

(71) Applicant: Microsoft Corporation, Redmond, WA (US)

(72) Inventors: David M. Callaghan, Kirkland, WA (US); Sergey Karamov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/762,379

(22) Filed: Feb. 8, 2013

(65) Prior Publication Data

US 2014/0227976 A1 Aug. 14, 2014

(51) Int. Cl.

| | |
|---|---|
| ***H04B 7/00*** | (2006.01) |
| ***G06F 9/445*** | (2006.01) |
| ***H04W 4/00*** | (2009.01) |
| ***H04L 29/08*** | (2006.01) |
| ***H04L 12/18*** | (2006.01) |
| *H04W 88/18* | (2009.01) |

(52) U.S. Cl.

CPC *G06F 8/65* (2013.01); *H04L 12/18* (2013.01); *H04L 67/2861* (2013.01); *H04L 67/34* (2013.01); *H04W 4/001* (2013.01); *H04W 88/182* (2013.01)

(58) Field of Classification Search

CPC ..... H04W 84/18; H04W 88/06; H04W 88/08; H04W 88/10; H04W 84/20

USPC .......................................................... 455/41.2

See application file for complete search history.

(56) References Cited

U.S. PATENT DOCUMENTS

| | | | | |
|---|---|---|---|---|
| 6,477,576 B2 * | 11/2002 | Angwin et al. | ............... | 709/226 |
| 6,909,721 B2 * | 6/2005 | Ekberg et al. | ............... | 370/401 |
| 8,285,199 B2 * | 10/2012 | Hsu et al. | ............... | 455/3.06 |
| 2002/0120750 A1 * | 8/2002 | Nidd | ............... | 709/227 |
| 2002/0136214 A1 * | 9/2002 | Do et al. | ............... | 370/392 |
| 2003/0203731 A1 * | 10/2003 | King et al. | ............... | 455/407 |
| 2007/0130626 A1 * | 6/2007 | Kato et al. | ............... | 726/27 |
| 2008/0133650 A1 * | 6/2008 | Saarimaki et al. | ............... | 709/203 |
| 2008/0279161 A1 * | 11/2008 | Stirbu et al. | ............... | 370/338 |
| 2008/0318602 A1 * | 12/2008 | Chang et al. | ............... | 455/466 |

(Continued)

FOREIGN PATENT DOCUMENTS

WO WO 0241118 A2 5/2002

OTHER PUBLICATIONS

"International Search Report & Written Opinion for PCT Application No. PCT/US2014/014970", Mailed Date: May 6, 2014, Filed Date: Feb. 6, 2014, 12 pages.

(Continued)

*Primary Examiner* — April G Gonzales

(74) *Attorney, Agent, or Firm* — Sunah Lee; Kate Drakos; Micky Minhas

(57) ABSTRACT

A pervasive service provides device specific updates. A proxy device receives an update request from a user device located proximate to the proxy device. The update request includes at least a user device identifier and a user device state. Update data associated with the user device identifier and the user device state is accessed. The proxy device transmits the device-specific update data to the user device. In some embodiments, the proxy device is a mobile device that detects or otherwise encounters a plurality of the user devices and provides device-specific updates thereto.

20 Claims, 4 Drawing Sheets

(56) References Cited

U.S. PATENT DOCUMENTS

| | | | | |
|---|---|---|---|---|
| 2009/0005005 | A1 * | 1/2009 | Forstall et al. | 455/411 |
| 2009/0235277 | A1 * | 9/2009 | Liu | 719/313 |
| 2011/0183619 | A1 * | 7/2011 | Satoh et al. | 455/41.2 |

OTHER PUBLICATIONS

Salminen, et al., "Enhancing Bluetooth Connectivity with RFID.", Retrieved at <<http://www.mediateam.oulu.fi/publications/pdf/709.pdf>>, Proceedings of the Fourth Annual IEEE International Conference on Pervasive Computing and Communications, Mar. 13, 2006, pp. 6.

"Jini", Retrieved at <<http://en.wikipedia.org/wiki/Jini>>, Retrieved Date: Nov. 29, 2012, pp. 4.

"Second Written Opinion Issued in PCT Application No. PCT/US2014/014970", Mailed Date: Jan. 8, 2015, 6 pages.

* cited by examiner

PERVASIVE SERVICE PROVIDING DEVICE-SPECIFIC UPDATES

BACKGROUND

Some user devices are capable of connecting to remote devices via global networks such as the Internet. Such devices have additional hardware and software to enable the connectivity, such as a network stack, a network adapter, a complex user interface, supporting logic, etc. However, this additional hardware and software results in increased cost and complexity for the user devices, especially when the connectivity is infrequently used (e.g., to occasionally obtain updates to the user devices). Further, even when the additional hardware and software is included with these user devices, connectivity to the global networks may not be available (e.g., due to lack of a nearby access point).

For such user devices and those user devices without the ability to connect to the global networks, a user may manually obtain and provide updates to the user devices. For example, the user may connect a computer or portable drive (e.g., a flash drive) to a printer to apply updates to software on the printer. Such an existing process, however, is manual, tedious, error prone, and time-consuming, especially when attempting to apply different updates to different user devices. These existing systems are not designed to efficiently obtain and provide updates to the user devices.

SUMMARY

Embodiments of the disclosure transmit update data from a proxy device to a user device. The proxy device receives an update request from the user device proximate to the proxy device. The update request includes at least a user device identifier and a user device state. In response to the received update request, update data associated with the user device identifier and the user device state is accessed by the proxy device. The accessed update data is transmitted from the proxy device to the user device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
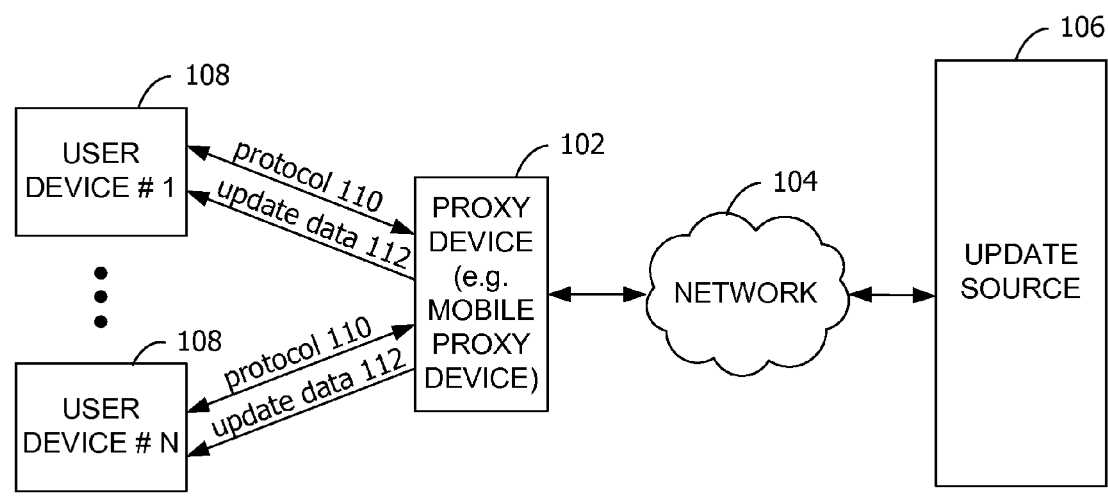
FIG. 1 is an exemplary block diagram illustrating a system for transmitting update data to user devices by a mobile proxy device from an update source.

Referring to FIG. 1 through FIG. 4, embodiments of the disclosure obtain and transmit device-specific update data 112 from a proxy device 102 to a user device 108. In some embodiments, the user device 108 lacks connectivity to an update source 106 to obtain the update data 112. For example, the user device 108 may lack a user interface to support update process, a user interface to show update progress, a network stack, hardware to communicate with the update source 106, and/or a communication interface to connect to the update source 106. As another example, the user device 108 may have the ability to obtain the update data 112 from the update source 106, but a connection is unavailable (e.g., due to network issues, lack of an access point, etc.).

Aspects of the disclosure are operable with any proxy device, including both mobile and non-mobile (e.g., in a fixed location, permanently or temporarily). That is, in some embodiments, the proxy device 102 does not have to move to provide the functionality illustrated and described herein.

In some embodiments, the proxy device 102 may periodically and/or intermittently broadcast an update service 212 (e.g., using the protocol 110) to at least one user device 108 within a range of the communication interface of the proxy device 102. The proxy device 102 may broadcast the update service 212 when the proxy device 102 detects at least one user device 108 located proximate to the proxy device 102. The user device 108 is said to be located proximate to the proxy device 102 when the user device 108 is within the range of the proxy device 102. The range may vary, and is dependent on the technology used by the proxy device 102 to determine proximity (e.g., Bluetooth brand of communication module has an exemplary range of 10 meters, near-field communication (NFC) has an exemplary range of 0.2 meters, etc.) of the user devices 108.

The proxy device 102 receives an update request, including at least a user device identifier and a user device state, from the user device 108 when the user device 108 is proximate to the proxy device 102. For example, the proxy device 102 may receive the update request just after broadcasting the update service 212, after a predefined period of time after broadcasting the update service 212, and/or the next time the user device 108 is proximate to the proxy device 102. In other embodiments, the proxy device 102 may receive the update request from the user device 108 without first broadcasting the update service 212.

Responsive to the received update request, the proxy device 102 accesses, from the update source 106, update data 112 associated with the user device identifier and/or the user device state. The accessed update data 112 is transmitted from the proxy device 102 to the user device 108 from which the update request was received. In some embodiments, the accessed update data 112 may be transmitted to all proximate user devices 108 which share characteristics with the user device identifier and/or the user device state of the user device 108 from which the update request was received.

Aspects of the disclosure further enable the user device 108, that may lack proper support for performing the update process, to be updated with update data 112 received from the update source 106 via the proxy device 102. For example, some of the exemplary user devices 108 may not have a connection to the update source 106 but aspects of the disclosure operate to provide updates without the additional burden of adding hardware and/or software to such user devices 108 to enable connectivity to the update source 106. For example, the user device 108 may not have a user interface to perform the update process and/or may not have the capability of connecting to the update source 106, yet still may be updated using the aspects of the disclosure. Further, the user device 108 is simplified in design, is easy to update, and may have a reduced price due to less hardware and/or software costs. For example, an agent on each user device 108 performs the update.

When the user device 108 receives the update from the proxy device 102, the user device 108 can install the update immediately or delay the installation to a future time when the user device 108 is taken offline (e.g., during a maintenance cycle). The update may be installed by overwriting the previous software files and rebooting the user device 108. Alternative embodiments of installing the update may uncompress the update payload if the update payload is compressed, and/or optionally perform hash verifications or cryptographic signature checks to ensure the integrity and authenticity of the update files before installing them. The user device 108 may contain an update patch installer that can install a smaller differential update which only contains the changes to the existing files on the user device 108 instead of an entirely new copy of the existing file. It should be appreciated that the proxy device 102 may mount the user device 108 as a remote file system and write the updated files to the user device 108 before making the user device 108 use the new software through software commands or simply rebooting the user device 108, at which time the user device 108 loads and executes the new software version.

Referring to FIG. 1, an exemplary block diagram illustrates the proxy device 102 broadcasting the update service 212 (shown in FIG. 2) as a protocol 110 to the user devices 108 communicatively coupled with the proxy device 102. The user devices 108 include, for example, user device #1 through user device #N. The proxy device 102 in FIG. 1 may be a mobile proxy device. In the example of FIG. 1, the proxy device 102 associated with the user devices 108 represents a system for transmitting device-specific update data 112 to proximate user devices 108.

The proxy device 102 may include a mobile computing device or any other portable device. In some embodiments, the mobile computing device includes a mobile telephone, laptop, tablet, computing pad, netbook, gaming device, personal digital assistant (PDA), and/or portable media player. Additionally, the proxy device 102 may represent a group of processing units or other computing devices. The proxy device 102 may also represent a modem, a gateway, and router type devices such as a Wi-Fi router or network switch.

Figure 3:
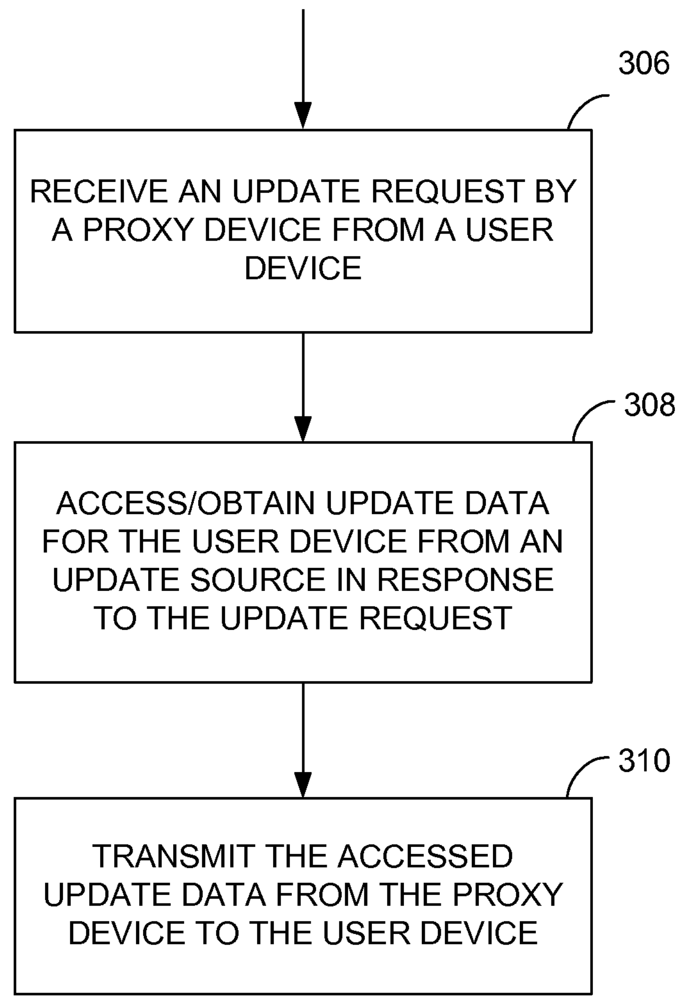
FIG. 3 is an exemplary flow chart illustrating operation of the proxy device to transmit device-specific update data to the user devices in response to a request for the update data.

The user devices 108 may include less portable devices such as desktop personal computers, kiosks, a refrigerator, a television, home appliances, industrial control devices, wireless charging stations, electric automobile charging stations, programmable heating and/or cooling devices, elevator, sewing machine, mass storage devices, and tabletop devices. In some embodiments, the user device 108 may be an in-vehicle entertainment system. In an example embodiment, one of the user devices 108 may act as the proxy device 102, such as when the functionality of the proxy device 102 cannot be used (e.g., the proxy device 102 may temporarily be disconnected from the network 104). In such an example, the user device 108 is specially programmed with instructions such as shown in FIG. 3.

In some embodiments, the user devices 108 may be located in the same geographical area (e.g. a home, an office, a car, a restaurant, a shopping mall, a building, etc.). In other embodiments, the user devices 108 are spread across multiple geographic locations. For example, a technician associated with a manufacturer of one or more of the user devices 108 may drive down a street and attempt to update the user devices 108 located within the homes on the street. In another example, a shopping mall owner or the manufacturer of the user devices 108 may provide the update service 212 for all the shops in the mall.

The proxy device 102 broadcasts the update service 212 to one or more of the user devices 108. The user devices 108 are located proximate to the proxy device 102. Exemplary user devices 108 may lack a connection to the update source 106. For example, the user device 108 may lack a direct connection to the update source 106 which is remote from the user device 108. The update service 212 may be running on the proxy device 102 and a counterpart update service may be running on the update source 106. The update source 106 may be, for example, a cloud-based service, a server, a cluster of servers, multiple different servers, and/or a peer device. In an example embodiment, there may be multiple update sources 106 having different update data 112 corresponding to different user devices 108. The update data 112 may be determined by the attributes of the user device 108 such as temperature, geographic location (e.g., global positioning system location), time of day, in-service data, usage statistics, and attributes of the proxy device 102 such as its geographic location.

The proxy device 102 receives an update request from the user device 108. In some embodiments the update request includes at least a user device identifier and a user device state. The user device identifier comprises a type, a model number, a serial number, a manufacturer name, a version, and/or a date associated with the user device 108. The user device state comprises the software state, firmware state, and/or hardware state associated with the user device 108. These lists of user device identifiers and user device state are intended to be exemplary only and one of skill in the art would recognize alternatives all of which are intended to be within the scope of this disclosure. The user device state may correspond to any component in the user device 108 that is updatable via update data 112 obtained from the update source 106. The update request may additionally include any other exemplary property or identifier to uniquely identify the user device 108 from other user devices 108. For example, a batch number associated with the user device 108 and/or a desired time for the user device 108 to receive update data 112 may be received with the update request. The user device 108 may transmit information such as global positioning system (GPS) location, usage statistics, and time of day. The proxy device 102 may use this information itself or obtain different update data 112 from the update source 106 based on this information.

In response to the update request received from the user device 108, the proxy device 102 obtains the update data 112 from the update source 106 via network 104. Update data 112 is associated with the user device identifier and the user device state from the received update request. The obtained update data 112 is transmitted from the proxy device 102 to the user device 108.

In aspects of the disclosure, the proxy device 102 obtains the update data 112 via network 104 supporting any quantity and type of wireless and/or wired communication modes including cellular division multiple access (CDMA), Global System for Mobile Communication (GSM), wireless fidelity (WiFi), 4G/Wi-Max, and the like. Other modes of communication for network 104 are within the scope of the disclosure as would be recognized by one skilled in the art. While the user devices 108 in some embodiments may have functionality implementing support for such networks 104, aspects of the disclosure are operable in lieu of the user devices 108 using such functionality.

The update data 112 is transmitted from the proxy device 102 to the user device 108 via short wavelength radio signals, high frequency radio signals, and/or a wired serial connection. For example, the update data 112 may be transmitted from the proxy device 102 to the user device 108 via any type of wireless and/or wired connection including wireless fidelity (WiFi), BLUETOOTH brand communications, Infrared Data Association (IrDA) protocols, radio frequency (RF) communication, Ethernet, universal serial bus (USB), FireWire brand communications, near-field communication (NFC), and the like.

The user devices 108, for example, lack the ability to perform a backup before applying the update, to store multiple versions of the updates, and/or to store an update history. The user devices 108 may also lack a complete networking stack to connect to the update source 106. In some embodiments, no user interface with update progress is shown on the user device 108. In an example embodiment, the user interface with update progress may be shown on the proxy device 102 whereas in another embodiment the user interface with update progress may not be shown on any of the user devices 108 or the proxy device 102. The update on the user device 108 may be performed automatically without any user interaction on the user device 108 and/or the proxy device 102. Thus, the amount of code (e.g., software) installed on the user devices 108 of the disclosure may be reduced (e.g., by ten percent) compared to the user devices of existing systems that implement the update process and/or networking stack and associated hardware. In addition, the software complexity and security that is required in some existing systems to select and transport the correct software from the update source 106 is not required by each of the user devices 108. Further, user devices 108 of the disclosure need not be trusted to access the update source 106 directly to obtain the update data 112. In embodiments in which a fee is assessed to the user devices 108 for the update services performed, the proxy device 102 may handle the processing of this fee.

In an example, the user device 108 may be configured via the proxy device 102 to receive or not to receive the update data 112. In such scenarios, the user device 108 may not listen for a broadcast of the update service 212. The user device 108 may also be configured to receive update data 112 on predefined days or at predefined times. For example, the user device 108 may receive update data 112 only on weekdays and not on weekends. The user device 108 may be configured to receive update data 112 only during particular hours such as during daytime and not during the night. Any combination of predefined days and predefined times for configuring the user device 108 to receive or not to receive update data 112 is possible and within scope of the disclosure. In still another example, the user device 108 is configured to only accept update data 112 after a power cycle before resuming normal operation. Other examples of configurable events that limit when the update occurs are within the scope of the disclosure.

A user or administrator of the proxy device 102 may deny or reject the update request received from the user device 108. For example, the proxy device 102 may reject the update request when a subscription, associated with the user device 108, to receive the update data 112 has expired or a payment for an earlier update remains unpaid. In another exemplary embodiment, the user of the user device 108 may decline receiving update data 112. In such scenarios, the user device 108 may be presented with an option to accept or decline the update and the option may be exercised by pressing a hard button, a soft button, or other similar user interface element on the user device 108. As another example, the user and/or proxy device 102 may only accept or perform updates that represent a major or significant version increment, while skipping the less significant software increments. For example, the user device 108 and/or proxy device 102 may be configured to skip beta versions of the update data 112. In another example, the user or the proxy device 108 may be configured to receive every available update.

Aspects of the disclosure are operable with the user devices 108 that are not allowed, per corporate or contractual policy, to access the update source 106 directly. For example, the user devices 108 located behind corporate firewalls or used by government defense contractors may be updated via the proxy device 102 as described herein.

Figure 2:
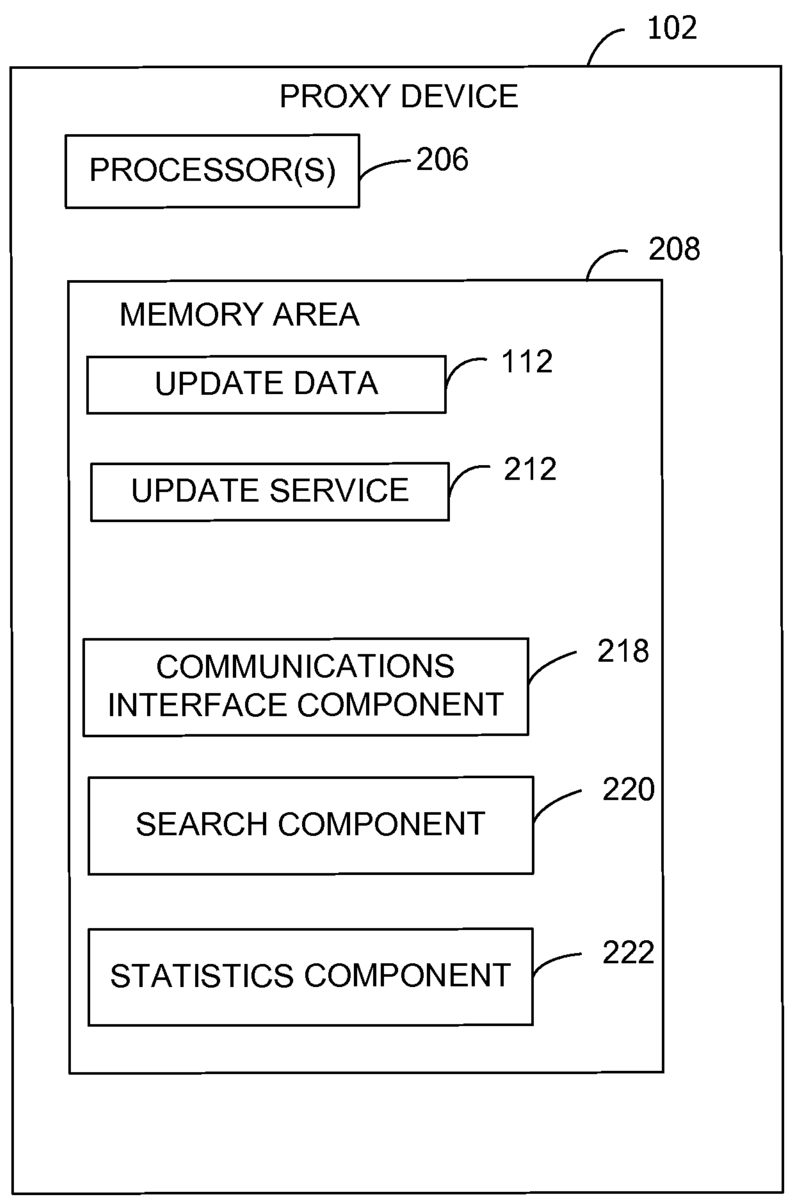
FIG. 2 is an exemplary block diagram illustrating a proxy device with executable components for obtaining and transmitting update data to the user devices.

Referring next to FIG. 2, the proxy device 102 is a computing device having at least one processor 206 and a memory area 208 associated therewith. The processor 206 includes any quantity of processing units, and is programmed to execute computer-executable instructions for implementing aspects of the disclosure. The instructions may be performed by the processor 206 or by multiple processors 206 executing within the proxy device 102, or performed by a processor 206 external to the proxy device 102. In some embodiments, the processor 206 is specially programmed to execute instructions such as those illustrated in the figures (e.g., FIG. 3).

In some embodiments, the processor 206 represents an implementation of analog techniques to perform the operations described herein. For example, the operations may be performed by an analog computing device and/or a digital computing device.

The proxy device 102 further has one or more computer readable media such as the memory area 208. The memory area 208 includes any quantity of media associated with or accessible by the computing device. The memory area 208 may be internal to the computing device (as shown in FIG. 2), external to the computing device (not shown), or both (not shown). In some embodiments, the memory area 208 includes read-only memory and/or memory wired into an analog computing device.

The memory area 208 stores, among other data, the update data 112 and the update service 212. The memory area 208 may optionally store predefined user device identifiers (not shown) associated with the user devices 108 that could be updated by the proxy device 102. Thus, the proxy device 102 may transmit update data 112 to only those user devices 108 whose identifiers are stored in the memory area 208. The predefined user device identifiers may be stored under the following exemplary conditions: after the user device 108 registers itself to receive update data 112, after a user of the proxy device 102 has input user device identifiers which may possibly receive update data 112 via the proxy device 102, after the proxy device 102 has detected the proxy device 102, and/or after the proxy device 102 has applied an update to the user device 108.

The memory area 208 further stores one or more computer-executable components. Exemplary components include a communications interface component 218, a search component 220, and a statistics component 222. Operation of the computer executable components is described next with reference to FIG. 3 and FIG. 4.

Referring next to FIG. 3, an exemplary flow chart illustrates operation of the proxy device 102 to transmit update data 112 to proximate user devices 108. At 306, the proxy device 102 receives an update request from at least one user device 108 which is proximate to the computing device. The update request includes at least the user device identifier and the user device state. The proxy device 102 may receive a plurality of update requests from different user devices 108 simultaneously. In some embodiments, the proxy device 102 may receive multiple update requests from the same user device 108.

In other embodiments, the proxy device 102 may receive one or more of the update requests from the user devices 108 without broadcasting the update service 212. For example, the user devices 108 may periodically send the update requests as a "ping" message with the expectation that the proxy device 102 will eventually be available (e.g., within proximity).

In response to the received update request, aspects of the disclosure at 308 access update data 112 associated with the user device identifier and the user device state. The update request includes, for example, authentication information, authorization information, and/or permissions. The authentication information includes identifiers for each user device 108 that are, in some embodiments, unique among the user devices 108. The authorization information includes information such as a username and password which may allow access to the update source 106. While there may be various versions available on the update source, update data 112 associated with the user device identifier and the user device state is accessed by the proxy device 108.

In some embodiments, the authentication information, received from the user device 108 as part of the update request, is presented to the update source 106 when accessing the update data 112. The authentication information may include a user device identifier. In some embodiments, the authentication information is presented only once at the time of registration of the user device 108 with the update service 212. In some embodiments, the proxy device 102 may store the authentication information associated with the user device 108 and present it to the update source 106 on receiving the update request. In an exemplary embodiment, the authentication information is received from the user device 108 every time the proxy device 102 receives the update request. In this manner, the proxy device 102 is able to request device-specific updates by presenting data associated with the specific user device 108.

In some embodiments, the proxy device 102 may not present the received authentication information, authorization information, and/or permissions to the update source 106. For example, the update source 106 may periodically and/or intermittently push update data 112 associated with the user device identifier and user device state to the proxy device 102. The update source 106 may push update data 112 for the user devices 108 to only the proxy devices 102 located in proximity of those user devices 108, in some examples. The update source 106 may rely on sales or warranty registration data to identify the locations of those user devices 108.

In another exemplary embodiment, the proxy device 102 may reject an update request and not present information received from the user device 108 to the update source 106. For example, the proxy device 102 may reject the update request after a predefined time period or after providing a predefined number of updates to that particular user device 108 (or class, model, manufacturer, etc. of user devices 108). The predefined time period defines a validity period (e.g. a subscription period) when update data 112 is allowed to be transmitted to the user device 108. The predefined number of updates is defined by the number of updates purchased or otherwise available to a user of the user device 108 (e.g. a user is within a warranty period after the user device 108 is purchased, a number of pre-paid updates were included in the purchase, etc.). After application of the allowed number of updates, the user of the user device 108 may purchase additional updates as desired. In some embodiments, the user may disable application of updates for a defined period of time or disable application of minor updates (e.g., ignore incremental updates, only apply major updates, etc.).

In some embodiments, the received authentication information may be presented to the update source 106 after the predefined time period (e.g. subscription period) or the predefined number of updates (e.g. warranty period) are over.

The proxy device 102 may selectively broadcast the update service 212, such as only when proximate to at least one of the user devices 108 and/or only when at least one of the proximate user devices 108 has been targeted or identified to receive an update. This saves battery power of the proxy device 102 by eliminating unnecessary broadcasting.

Figure 4:
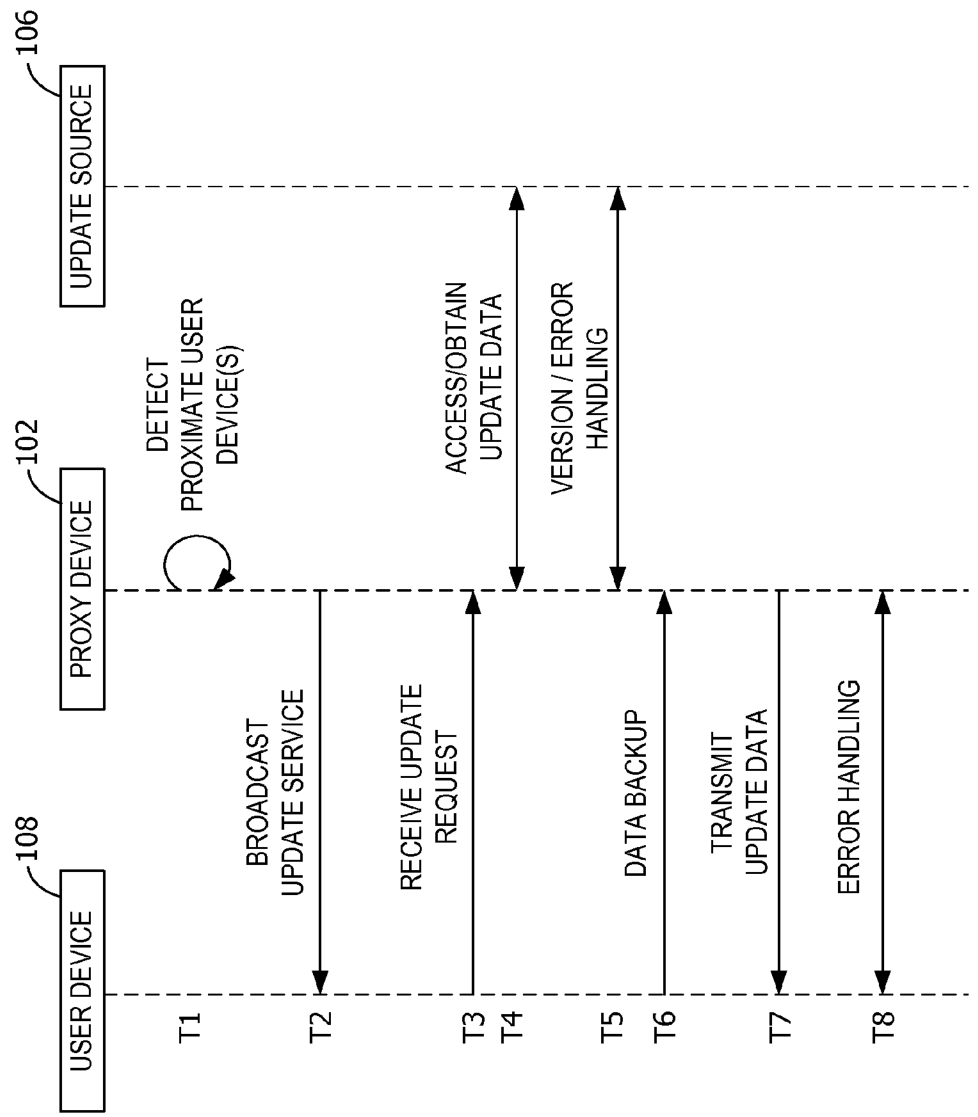
FIG. 4 is an exemplary sequence diagram illustrating execution of an update service on the proxy device to transmit device-specific update data from an update source to the user devices.

Accessing the update data 112 includes obtaining the update data 112 from the update source 106 remote from the user device 108. In some embodiments, if the update data 112 is already present at the proxy device 102 or if the update data 112 at the update source 106 is of an older version, the update data 112 is not obtained from the remote update source 106. For example, the user device 108 may have a more recent version than that available on the update source 106. In an example embodiment, version checking and/or error handling of the update data 112 corresponding to the update request is performed on the proxy device 102, on the update source 106, or on both as shown in FIG. 4.

In another embodiment, update data 112 is accessed by searching a memory area 208 accessible to the proxy device 102. For example, the update source 106 may be found by performing a web search corresponding to the update request. In some embodiments, the update source 106 may be predefined (e.g., preloaded, pre-obtained, etc.) on the proxy device 102. In some other embodiments, the update source 106 may be provided by a user of the proxy device 102. For example, the user of the proxy device 102 may input a universal resource locator (URL) of the update source 106. In an exemplary embodiment, the update request from the user device 108 includes the update source 106 as well. For example, the URL to access the update source 106 is received along with the update request (e.g. programmed by a manufacturer of the user device 108).

The update data 112 corresponds to any update including, but not limited to a software update, application update, and/or any other component update on the user device 108. In an exemplary embodiment, the update data 112 may provide a news update, weather update, stock update, and any other update the user device 108 is configured to receive.

At 310, the proxy device 102 transmits the accessed update data 112 from the proxy device 102 to the user device 108. In some embodiments, the update data 112 is transmitted only after version checking and/or error handling is completed. For example, version checking may be performed by comparing the version on the user device 108 with the version on the update source 106, while error handling may be performed by restoring a previous state from a backup of the user device 108 if installation of the update fails. The version checking and error handling may be performed on the proxy device 102, the update source 106, or both. Other ways of performing version checking and error handling not described herein are within scope of the present disclosure.

The proxy device 102 transmits the accessed update data 112 via, for example, a file transfer protocol (FTP), a secure share, and/or a hypertext transfer protocol (HTTP). Any other means of transmitting update data 112 from the proxy device 102 to the user device 108 is also within the scope of this disclosure.

The memory area 208 may store a backup of the user device state. The proxy device 102 may receive the backup before transmitting the obtained update data 112. In some embodiments, the proxy device 102 sends an indication to the user device 108 to send the backup of the user device state before transmitting the update data 112. In an exemplary embodiment, the proxy device 102 applies the update data 112 to a copy of the backup of the user device state and transmits the update data 112 to the user device 108 only after successful application of the update data 112 to the copy.

The memory area 208 stores exemplary components as shown in FIG. 2. For example, the communications interface component 218, when executed by the processor 206 of the proxy device 102, causes the processor 206 to receive, by the proxy device 102, an update request from at least one user device 108 proximate to the proxy device 102. The update request includes at least a user device identifier and a user device state.

The communications interface component 218 executes instructions which cause the processor 206 of the proxy device 102 to broadcast the update service 212 to at least one user device 108 located proximate to the proxy device 102. In some embodiments, the proximity of the user devices 108 is defined by a range corresponding to the communication interface (e.g. BLUETOOTH brand communication module provide an exemplary range of ten meters) between the proxy device 102 and the user devices 108. The proxy device 102 may receive update requests from multiple user devices 108 using different communication interfaces. The update requests may be received by the proxy device 102 simultaneously from multiple user devices 108.

In some embodiments, the update requests may be processed by the proxy device 102 in batch mode. For example, the user of the proxy device 102 walks around the geographical area collecting update requests from the user devices 108. The proxy device 102 may then perform batch processing on the collected update requests at a subsequent point in time. For example, the proxy device 102 may then obtain update data 112 corresponding to one or more of the user devices 108 for which the update requests are collected. The user of the proxy device 102 may again walk around the geographic area transmitting the obtained update data 112 corresponding to the user devices 108. In some embodiments, the update data 112 may remain in a cache of the proxy device 102 until deleted after a certain amount of time since the last use or until additional space is needed to store more recently required update data 112.

The update requests may be prioritized by the proxy device 102 based on user device identifier, user device state, location of the mobile device, and/or usage charges associated with updating the user device 108 at that location and at that time. The usage charges, for example, may be more or less while roaming outside home location or there may be differential usage charges for peak or non-peak time updates.

The proxy device 102 may periodically and/or intermittently broadcast the update service 212. In another embodiment, to conserve battery power, the proxy device 102 broadcasts the update service 212 to the user devices 108 based on an input from a user of the proxy device 102. In some embodiments, the user devices 108 continually listen for the update service 212 broadcasted from the proxy device 102.

The user devices 108 may send the update request to the proxy device 102 if particular parameters are met. Exemplary parameters include, but are not limited to, the user device 108 cannot connect to the update source 106, the broadcasting proxy device 102 is authorized to pass the update data 112 to the user device 108, and/or a predefined time interval for periodic updates is over.

In some embodiments, the communications interface component 218 includes a network interface card and/or computer-executable instructions (e.g., a driver) for operating the network interface card. Communication between the proxy device 102 and user devices 108 may occur using any protocol or mechanism over any wired or wireless connection. For example, aspects of the disclosure are operable via any combination of wireless and/or wired communication interface including wireless fidelity (WiFi), BLUETOOTH brand communication module, IrDA set of protocols, radio frequency (RF) communication, Ethernet, universal serial bus (USB), FireWire brand of communication module and the like. In some embodiments, the communications interface is operable with near-field communication (NFC) tags. For example, a user of the proxy device 102 may tap the proxy device 102 on the user device 108 to start the update process.

The search component 220, when executed causes at least one processor 206 to access, in response to the received update request, the update data 112 associated with the user device identifier and the user device state. The communications interface component 218 transmits the accessed update data 112 from the proxy device 102 to the user device 108. In an example embodiment, the update data 112 is obtained from the update source 106 by the proxy device 102. The proxy device 102 may store the update data 112 for a predetermined time period (e.g., to apply to other user devices 108 of the same model, having the same device state, etc.). The update data 112 may be removed from the proxy device 102 after expiration or lapsing of the predefined time period. In another embodiment, the proxy device 102 may obtain the update data 112 every time an update request is received.

The statistics component 222, when executed causes at least one processor 206 to generate update metrics relating at least to transmission of the accessed update data 112 by the communications interface component 218. The update metrics include a quantity of received update requests, an amount of transmitted update data 112, a duration associated with each transmission of the update data 112, update success rates, and/or update failure rates. The update metrics may additionally include usage charges associated with updating the user device 108, the types of update requests, and a quantity of pending update requests. The proxy device 102 may decide to keep the update data 112 based on similarity in the type of pending update requests. For example, frequently transmitted update data 112 or popular update data 112 may be stored by the proxy device 102 for future use to minimize network usage charges.

The usage charges may correspond to an individual update, update type and version, each user device 108, the user of the user devices 108, proxy device 102, location of the proxy device 102, time of update, and/or the user of the proxy device 102. The user of the user device 108 and the user of the proxy device 102 may have usage charge accounts maintained on the update source 106. These users may be identifiable from the update request (e.g. included in authentication information). The usage charges may help the user decide whether to opt for receiving the update data or not.

The statistics component 222 includes a graphics card for displaying data to the user and receiving data from the user. The statistics component 222 may also include computer-executable instructions (e.g., a driver) for operating the graphics card. Further, the statistics component 222 may include a display (e.g., a touch screen display or natural user interface) and/or computer-executable instructions (e.g., a driver) for operating the display. The statistics component 222 may also include one or more of the following to provide data to the user or receive data from the user: speakers, a sound card, a camera, a microphone, a vibration motor, one or more accelerometers, a BLUETOOTH brand of communication module, global positioning system (GPS) hardware, and/or a photoreceptive light sensor. For example, the user may input commands or manipulate data by moving the proxy device 102 in a particular way.

The statistics component 222 collects data describing, for example, a time of transmission for the update data 112, a location of the proxy device 102 during transmission of the update data 112, and/or an identifier associated with the accessed update data 112. In some embodiments, the statistics component 222 may publish the generated update metrics to the proxy device 102 based on a request from the user of the proxy device 102. In another embodiment, the statistics component 222 publishes the generated update metrics to a cloud service. From the generated update metrics, the statistics component 222 may identify the update data 112 having an update success rate exceeding a pre-defined threshold. The update success rate may be used to determine a particular time and/or location for performing the future updates. The statistics component 222 may publish the update metrics for each user device 108 or publish aggregated metrics for multiple user devices 108.

In some embodiments, the communications interface component 218 may notify a manufacturer of the user device 108 of one or more of the update metrics generated by the statistics component 222. The manufacturer may take a corrective or preventive measure based on the notification. For example, the manufacturer may recall some user devices 108 based on the update metrics. As another example, the manufacturer advertises at particular locations where the update success rate is greater or lesser. The manufacturer may even provide the proxy devices 102 at such locations to broadcast the update service 212 to the user devices 108.

Referring next to FIG. 4, the sequence diagram shows exemplary times for receipt/transmission of data. FIG. 4 lists some operations which may or may not be performed in some embodiments. Further, some of the operations may be performed at different times than those listed. Some other operations not listed in FIG. 4, but explained elsewhere in the present disclosure, are also within the scope of the present disclosure.

At time T1, the proxy device 102 attempts to detect proximate user devices 108. The proxy device 102 may offer to update numerous user devices 108 when the proxy device 102 has sufficient resources available to perform updates. In other scenarios, the proxy device 102 may throttle the quantity of updates provided to the user devices 108, such as when the quantity of user devices 108 overwhelms the resources of the proxy device 102 or outnumbers the quantity of proxy devices 102. The proxy device 102 may, in an alternative embodiment, encounter the user devices 108 at time T1. For example, the user device 108 may be transmitting the update request and the user device 108 may be encountered by the proxy device 102 when the proxy device 102 moves proximate to the user device 108.

At time T2, the proxy device 102 broadcasts the update service 212. Transmission of the update service 212 may be done periodically, intermittently, and/or only upon detection of at least one of the user devices 108. In some embodiments such as when the user device 108 has already been encountered by the proxy device 102, the proxy device 102 may not broadcast the update service 212.

At time T3, the proxy device 102 receives the update request from the user device 108. In an alternative embodiment, the user device 108 initiates contact with the proxy device 102, without the proxy device 102 detecting the user device 108 at time T1 and without broadcasting the update service 212 at time T2. For example, the user device 108 may initiate contact by broadcasting an update request that is received by the proxy device 102.

At time T4, the proxy device 102 accesses and/or obtains the update data 112 from the update source 106. At time T5, version checking and/or error handling is performed on the proxy device 102 or the update source 106 or both.

In some embodiments such as when the update data 112 is pushed to the user device 108 via the proxy device 102 from the update source 106, no update request is received by the proxy device 102.

At time T6, the proxy device 102 may receive a data backup of the user device 108. At time T7, the proxy device 102 transmits the update data 112 to the user device 108. In some embodiments, the proxy device 102 transmits, at time T7, the update data 112 without receiving the data backup from the user device 108. At time T8, error handling may be performed by the proxy device 102. For example, a restore of the user device 108 is performed from the data backup if an error is detected during the update process.

Additional Examples

Aspects of the disclosure enable additional scenarios such as those next described. In an example scenario, a mobile phone may transmit update data 112 to the user device 108 (e.g. in-vehicle entertainment system). The user device 108 in such scenarios may not have a connection with the update source 106 or the user device 108 may not have any update service or update interface.

The user devices 108 and the proxy device 102 may be located near each other (e.g. in the same house). The range for communication between the proxy device 102 and the user devices 108 may depend on the communication interface used for by the proxy device 102 to receive update requests or to broadcast the update service 212. The proxy device 102 may simultaneously receive update requests via multiple communication interfaces (e.g. WiFi and BLUETOOTH) on the proxy device 102. Similarly, the proxy device 102 may simultaneously broadcast the update service 212 on multiple communication interfaces.

The user device 108 and the proxy device 102 may work in peer-to-peer relationship or in a client-server relationship. For example, a mobile server device (e.g., proxy device 102) may connect with a client device (e.g., the user device 108) as a mass storage device. The mobile server device then transmits the update data 112 to the client device (e.g., the user device 108). The update data 112 may directly overwrite data on the client device.

The mobile server device may update multiple different kinds or types of user devices 108. In such scenarios, the proxy device 102 may simultaneously broadcast multiple, different update services 212 to cover the different kinds of user devices 108.

The proxy device 102 represents any computing device executing instructions (e.g., as application programs, operating system functionality, or both) to implement the operations and functionality associated with the proxy device 102.

In some embodiments, the user device 108, in response to the broadcasted update service 212, may send information such as a barcode, update status, software status, current software version, an indication whether the user device 108 is fault tolerant, and/or an indication whether to backup data of the user device 108 before the update. The proxy device 102 may use this information to make the update process specific to a particular user device 108, rather than merely broadcasting a generic update to all the user devices 108. For example, the proxy device 102 makes the update process specific to the user device 108 by performing additional or fewer operations during the update process based on the information received from the user device 108.

In an example scenario, the update process allows a set of federated user devices 108 to request updates and the corresponding update data 112 is automatically delivered from authorized host devices (e.g. proxy device 102). In some embodiments, the proxy device 102 roams the geographic area updating user devices 108 in proximity for which the proxy device 102 has update authority and/or authorization. In an exemplary embodiment, each of the user devices 108 may identify a set of proxy devices 102 with update authority and/or authorization.

The proxy device 102 may offer the user of the proxy device 102 a setting to configure when to initiate broadcast of the update service 212. If the update authorization is not desired to be based on specific parameters (e.g., machine access control (MAC) address) or connection-specific parameters (e.g. Internet protocol (IP) address) of the user device 108, the user of the proxy device 102 may define an update password that will be used to authorize updates.

In an example embodiment, the proxy device 102 passes the update request to a search engine that identifies the update source 106 based on the user device identifier and the user device state.

In another example embodiment, if the proxy device 102 is processing an update request received from a first user device 108 and a new update request is received from a second user device 108, the new update request from the second user device 108 may be queued for subsequent processing, or the new update request may be processed concurrently with the ongoing processing of the update requests. Further, the proxy device 102 aborts the update process if the connection interface between the user device 108 and the proxy device 102 is broken or out of range. In such a scenario, the update does not take place on the user device 108.

If the update was not successful during the earlier attempt, the update process may resume from the point at which the update process was suspended. The resumption of the update process happens when the proxy device 102 again moves proximate to the user device 108. In some embodiments, the update process is performed when the proxy device 102 is proximate to the user device 108 for a predetermined time period (e.g., one minute). The predetermined time period helps in determining that the connection between the proxy device 102 and the user device 108 is likely to be stable, or is tested to confirm a particular quality of service (e.g., connection speed).

The update process ends once the update data 112 has been transmitted from the proxy device 102 to the user device 108. Even if the connection interface with the user device 108 is broken or the user device 108 becomes out of range after the update data 112 has been transmitted, the user device 108 may still complete the update by applying the update data 112.

At least a portion of the functionality of the various elements in FIG. 1 and FIG. 2 may be performed by other elements in FIG. 1, FIG. 2, or an entity (e.g., processor, web service, server, application program, computing device, etc.) not shown in FIG. 1 or FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "NFC" as used herein refers, in some embodiments, to a short-range high frequency wireless communication technology for the exchange of data over short distances. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for detecting and updating the user device 108.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more computer storage devices embodying computer-executable components, said components comprising: a communications interface component that when executed causes at least one processor to receive, in a mobile proxy device, an update request from at least one user device proximate to the mobile proxy device, the update request including at least a user device identifier and a user device state; a search component that when executed causes at least one processor to access, in response to the received update request, update data associated with the user device identifier and the user device state, the communications interface component further transmitting the accessed update data from the mobile proxy device to the user device; and a statistics component that when executed causes at least one processor to generate update metrics relating at least to transmission of the accessed update data by the communications interface component.

2. The computer storage devices of claim 1, wherein the update metrics comprise one or more of the following: a quantity of received update requests, an amount of transmitted update data, a duration associated with each transmission of the update data, update success rates, and update failure rates.

3. The computer storage devices of claim 1, wherein the statistics component further comprises collecting data describing one or more of the following: a time of transmission for the update data, a location of the mobile proxy device during transmission of the update data, and an identifier associated with the accessed update data.

4. The computer storage devices of claim 1, wherein the statistics component further publishes the generated update metrics to a cloud service.

5. The computer storage devices of claim 1, wherein the statistics component further identifies, from the generated update metrics, the update data having an update success rate exceeding a pre-defined threshold.

6. The computer storage devices of claim 1, wherein the communications interface component further notifies a manufacturer of the user device of one or more of the update metrics generated by the statistics component.

7. A system for updating proximate devices, said system comprising:

a memory area associated with a mobile proxy device, said memory area storing update data; and a processor programmed to:

receive, by the mobile proxy device, an update request from at least one user device proximate to the mobile proxy device, the update request including at least a user device identifier and a user device state;

access, in response to the received update request, the update data associated with the user device identifier and the user device state;

transmit the accessed update data from the mobile proxy device to the user device; and generate update metrics relating at least to transmission of the accessed update data.

8. The system of claim 7, wherein the update metrics comprise at least one of: a quantity of received update requests, an amount of transmitted update data, a duration associated with each transmission of the update data, update success rates, or update failure rates.

9. The system of claim 7, wherein the processor is further programmed to collect data describing at least one of: a time of transmission for the update data, a location of the mobile proxy device during transmission of the update data, or an identifier associated with the accessed update data.

10. The system of claim 7, wherein the processor is further programmed to publish the generated update metrics to a cloud service.

11. The system of claim 7, wherein the processor is further programmed to identify, from the generated update metrics, the update data having an update success rate exceeding a pre-defined threshold.

12. The system of claim 7, wherein the processor is further programmed to notify a manufacturer of the user device of one or more of the generated update metrics.

13. The system of claim 7, wherein accessing the update data comprises searching the memory area accessible to the mobile proxy device.

14. A method comprising:

receiving, by a proxy device, an update request from at least one user device proximate to the proxy device, the update request including at least a user device identifier and a user device state;

accessing, in response to the received update request, update data associated with the user device identifier and the user device state;

transmitting the accessed update data from the proxy device to the user device; and generating update metrics relating at least to transmission of the accessed update data.

15. The method of claim 14, wherein the update metrics comprise at least one of: a quantity of received update requests, an amount of transmitted update data, a duration associated with each transmission of the update data, update success rates, or update failure rates.

16. The method of claim 14, further comprising collecting data describing at least one of: a time of transmission for the update data, a location of the proxy device during transmission of the update data, or an identifier associated with the accessed update data.

17. The method of claim 14, further comprising publishing the generated update metrics to a cloud service.

18. The method of claim 14, further comprising identifying, from the generated update metrics, the update data having an update success rate exceeding a pre-defined threshold.

19. The method of claim 14, further comprising notifying a manufacturer of the user device of one or more of the generated update metrics.

20. The method of claim 14, wherein the proxy device is a mobile proxy device.

* * * * *